United States Patent [19]

Hohenshil et al.

[11] Patent Number: 5,098,061

[45] Date of Patent: Mar. 24, 1992

[54] CASCADED PNEUMATIC IMPULSE SEPARATION SYSTEM AND VALVES THEREFOR

[75] Inventors: Robert N. Hohenshil; James C. Putt, both of Doylestown; Richard L. Rauckhorst, North Canton; David M. Ronyak, Copley, all of Ohio

[73] Assignee: The B. F. Goodrich Company, Akron, Ohio

[21] Appl. No.: 325,271

[22] Filed: Mar. 17, 1989

Related U.S. Application Data

[63] Continuation-in-part of Ser. No. 240,030, Sep. 2, 1988, Pat. No. 4,878,647.

[51] Int. Cl.⁵ .................... F16K 31/40; B64D 15/16
[52] U.S. Cl. ............... 251/30.05; 137/624.14; 244/134 A
[58] Field of Search .......... 244/134 A; 251/29, 30.02, 251/30.05; 222/3, 195; 137/624.14

[56] References Cited

U.S. PATENT DOCUMENTS

| | | | |
|---|---|---|---|
| 3,693,916 | 9/1972 | Tritt et al. | 244/134 A |
| 4,706,911 | 11/1987 | Briscoe et al. | 244/134 A |
| 4,747,575 | 5/1988 | Putt et al. | 251/30.02 |
| 4,826,108 | 5/1989 | Briscoe et al. | 244/134 A |
| 4,865,291 | 9/1989 | Briscoe et al. | 251/30.02 |

*Primary Examiner*—A. Michael Chambers
*Attorney, Agent, or Firm*—David M. Ronyak

[57] ABSTRACT

A rapid acting valve capable of delivering a high pressure impulse of compressible fluid has a pilot section, and an output section. The output section is pressurized to approximately equilibrium with the inlet pressure during the load portion of the operating cycle. During the dump portion of the operating cycle, the pilot section and output section cooperate to provide extremely rapid full opening of the output section to release fluid under pressure from an accumulator through an output section piston seat. The valve is particularly suitable for use in combination with pneumatic impulse separation systems such as those employed for deicing aircraft surfaces. A plurality of valves may be arranged in series such that dumping of the first tier valve initiates dumping of one or more second tier valves in the series each of which in turn initiates dumping of one or more third tier valves, and so forth until all valves in the series have been actuated, each by its preceding valve.

53 Claims, 6 Drawing Sheets

CASCADED PNEUMATIC IMPULSE SEPARATION SYSTEM AND VALVES THEREFOR

CROSS-REFERENCE TO RELATED APPLICATIONS

This application is a continuation-in-part of application U.S. Ser. No. 07/240/030 filed Sept. 2, 1988 entitled Pneumatic Impulse Valve and Separation System, no U.S. Pat. No. 4,878,647 the disclosure of which is herein incorporated by reference.

FIELD OF THE INVENTION

This invention relates to a fluid impulse separation system and pneumatic impulse valves therefor. More particularly, this invention pertains to an extremely rapid acting valve, or a series of valves, each capable of delivering an impulse of compressible fluid and to a fluid impulse separation system suitable for deicing of aircraft leading edge surfaces.

BACKGROUND OF THE INVENTION

From the beginning of powered aviation, aircraft have been under certain flying conditions troubled by accumulations of ice on component surfaces of aircraft such as wings and struts. If unchecked, such accumulations can eventually so laden the aircraft with additional weight and so alter the airfoil configuration of the wings and control surfaces of that aircraft so as to precipitate an unflyable condition. Efforts to prevent and-/or remove such accumulations of ice under flying conditions has resulted in three generally universal approaches to removal of accumulated ice, a process known generally as de-icing.

In one form of de-icing known as thermal de-icing, leading edges, are heated to loosen adhesive forces between accumulating ice and the aircraft component. "Leading edges" as used herein means those edges of an aircraft component on which ice accretes and are impinged upon by air flowing over the aircraft and having a point or line at which this airflow stagnates. Once loosened, this ice is generally blown from the aircraft component by the airstream passing over the aircraft. There are two popular methods of heating leading edges. In one approach known as electrothermal de-icing, an electrical heating element is placed in the leading edge zone of the aircraft component, either by inclusion in a elastomeric boot applied over the leading edge, or by incorporation into the skin structure of the aircraft component. This heating element is typically powered by electrical energy derived from a generating source driven by one or more of the aircraft engines and is switched on and off to provide heat sufficient to loosen accumulating ice. In small aircraft, a sufficient quantity of electrical power may be unavailable for use of electrothermal de-icing.

In the other heating approach, gases at elevated temperature from one or more compression stages of a turbine engine are circulated through the leading edges of components such as wings and struts in order to affect a de-icing or anti-icing effect. This approach is employed typically only in aircraft powered by turbine engines by draining off compressed air having an elevated temperature from one or more compressor stations of a turbine engine. This approach can result in reduced fuel economy and lower turbine power output.

The second commonly employed method for de-icing involves chemicals. In limited situations, a chemical has been applied to all or part of an aircraft to depress adhesion forces associated with ice accumulation upon the aircraft or to depress the freezing point of water collecting upon surfaces of the aircraft.

The remaining commonly employed method for de-icing is typically termed mechanical de-icing. In the principal commercial mechanical de-icing means, pneumatic de-icing, the leading edge zone or wing or strut component of an aircraft is covered with a plurality of expandable, generally tube-like structures, inflatable employing a pressurized fluid, typically air. Upon inflation, the tubular structures tend to expand substantially the leading edge profile of the wing or strut and crack ice accumulating thereon for dispersal into the airstream passing over the aircraft component. Typically, these tube-like structures have been configured to extend substantially parallel to the leading edge of the aircraft. These conventional low pressure pneumatic de-icers are formed from compounds having rubbery or substantially elastic properties. Typically, the material forming the inflatable tubes on such de-icer structures can expand or stretch by 40% or more during an inflatable cycle, thereby causing a substantial change in the profile the de-icer as well as in the leading edge to thereby crack ice accumulating on the leading edge. These conventional pneumatic de-icers require a large volume of air to inflate their highly expandable tubes and the time for inflating such tubes typically and historically has averaged from about two and six seconds. The distortion of the airfoil profile caused by inflation of the tubes can substantially alter the airflow pattern over the airfoil and adversely affect the lift characteristics of the airfoil. The rubber or rubber-like materials forming these conventional pneumatic de-icers typically are possessed of a Young's modulus (modulus of elasticity) of approximately 6900 Kpa. The modulus of elasticity of ice is variously reported as being between about 275,000 Kpa and about 3,450,000 Kpa. Ice is known to be possessed of an elastic modulus enabling typical ice accumulations to adjust to minor changes in contours of surfaces supporting such ice accumulations. While the modulus of elasticity of rubber compounds used in conventional de-icers is much lower than the modulus of elasticity typically associated with ice accumulations. The large expansion of conventional pneumatic de-icers has functioned to crack or rupture the structure of the ice accumulations thereby allowing such accumulations to be swept away by impinging windstreams.

Other mechanical means for effecting ice de-icing include electromechanical hammering such as that described in U.S. Pat. No. 3,549,964 to Levin et al. Concern respecting the susceptibility of the airfoil skin to stress fatigue upon being hammered over extended periods of time have functioned in part to preclude substantial commercial development or adoption of such technique.

Another electromechanical ice removal system is described in U.S. Pat. No. 4,690,353 to Haslim et al. One or more overlapped flexible ribbon conductors, each of which is folded back on itself, is embedded in an elastomeric material. When a large current pulse is fed to the conductor, the anti-parallel currents in the opposed segments of adjacent layers of the conductor result in interacting magnetic fields producing an electrorepulsive force between the overlapping conductor segments causing them to be separated near instantaneously. This distention tends to remove any solid body on the surface of the elastomeric material.

U.S. Pat. Nos. 4,706,911 to Briscoe et al and 4,747,575 to Putt et al disclose apparatus for de-icing leading edges in which an impulse of fluid under pressure is utilized to rapidly inflate an inflation tube positioned between a support surface and a sheet-like skin possessed of a substantially elevated modulus. The impulse of fluid is delivered to the inflation tube causing the high modulus skin to dislocate and then stop suddenly. Momentum imparted to the ice accumulations thereby causes additional ice movement which assists in ice detachment and dislodgement. The inflatable tubular structure in certain preferred embodiments is inflated within not more than about 0.1 second and preferably not more than about 0.5 milliseconds. FIG. 4 and the attendant description of U.S. Pat. No. 4,706,911 describe an ejector/pilot operated discharge valve suitable for use in such pneumatic impulse de-icers. In FIG. 7 and the attendant description of U.S. Pat. No. 4,747,575 there is described a chattering valve for use in a pneumatic impulse de-icer which delivers a rapid series of fluid pressure pulses to the inflatable tube of a de-icer apparatus affixed to a leading edge. Efforts to improve such pneumatic impulse de-icing systems have led to continuing efforts to improve valves for delivery of the desired fluid impulse.

SUMMARY OF THE INVENTION

According to an aspect of the present invention, there is provided a valve comprising pilot, and output sections, the pilot section including a pilot housing containing a pilot cavity, inlet conduit means extending from the exterior of the pilot housing to the pilot cavity, exhaust conduit means extending from the pilot cavity to the exterior of the pilot housing, and intermediate conduit means extending from the pilot cavity to said output section, gate means configured for movement from a load position during which the inlet conduit means is in fluid communication with said intermediate conduit means and a dump position during which the exhaust conduit means is in fluid communication with said intermediate conduit means while said inlet conduit means is disconnected from said intermediate conduit means; and the output section including an output housing containing an intermediate cavity having an inlet port in fluid communication with said intermediate conduit means, an exhaust vent, and an outlet port in fluid communication with output conduit means and accumulation means, the outlet port being proximate to the exhaust vent, and a poppet contained within said intermediate cavity configured for movement from a load position during which fluid under pressure may enter the intermediate cavity and force the poppet to seal off movement of fluid into the exhaust vent while permitting flow of fluid to the outlet port and a dump position during which fluid under pressure may flow from said accumulation means through said output conduit means to said vent.

According to another aspect of the invention, there is provided a valve comprising pilot and output sections, the pilot section including a pilot housing containing a pilot cavity, inlet conduit means extending from the exterior of the pilot housing to the pilot cavity, intermediate exhaust conduit means extending from the pilot cavity to the exterior of the pilot housing, a pilot piston reciprocably mounted within the pilot cavity and operably connected to gate means configured for movement between a load position during which the output section is sealed off from fluid communication with said intermediate exhaust conduit means and an outlet associated with said output section and a dump position during which said output section is in fluid communication with said intermediate exhaust conduit means and said outlet;

the output section including an output housing containing an output cavity having an inlet orifice, an outlet and accumulation means, said outlet being sealed against fluid communication with said output cavity when said gate means is in load position and in fluid communication with said output cavity when said gate means is in dump position, and an output poppet reciprocably contained within said output cavity configured for movement from a load position during which fluid under pressure may enter the output cavity and force the poppet to seal off movement of fluid into the outlet while permitting flow of fluid into the accumulation means, and a dump position during which fluid under pressure may flow from said accumulation means to said outlet, said accumulation means opening to said output cavity proximate to said outlet.

In preferred embodiments, the poppet and associated output cavity are of cylindrical shape and the end of the poppet facing the exhaust vent includes a frustoconical face capable of sealing against flow from the intermediate cavity when engaged with the poppet seat. The inclusion of this frustoconical sealing face serves to accelerate the opening of the valve because as pressure is released from the output cavity and the poppet respectively begins to move away from its corresponding annular seat, a greater area is presented to the escaping fluid causing an even greater force to be exerted on the poppet moving it even more rapidly away from its seated position.

In preferred embodiments, the housing is unitary and is formed of metal, and the poppet piston is of plastic material.

According to a further aspect of the invention, there is provided in combination a valve as aforedescribed and a fluid impulse separation apparatus which includes an outer surface layer formed of a material having a Young's modulus of at least 40,000 Kpa and at least one inflatable tubular member beneath the outer surface layer positioned such that fluid impulse inflation of the tubular member causes reaction movement of the outer surface layer to effect separation and dislodgement of any material lying thereon such as ice. In certain preferred embodiments, the outer surface layer is formed of a material having a Young's modulus of at least 275,000 kPa. In certain preferred embodiments, the outer surface layer is formed of metal selected from titanium and its alloys, aluminum and its alloys, magnesium and its alloys and stainless steels.

According to a further aspect of the invention, there is provided in combination a master valve comprising pilot and output sections, one or more slave valves each comprising pilot and output sections, and one or more fluid impulse separation apparatus(es). A fluid output of the master valve is operably connected by conduit means to the pilot section of one or more slave valves whereby initiation of dumping of the master valve initiates dumping of the slave valves. Other fluid outputs of the master and/or slave valves are operably connected by conduit means to fluid impulse separation apparatus. The valves and conduit means may be arranged to provide sequential or near simultaneous inflation of a plurality of inflatable tubular members within one or more fluid impulse separation apparatuses.

The above and other features and advantages of the invention will become more apparent when considered in light of the following description of preferred embodiments of the invention, in conjunction with the accompanying drawings which also form a part of the specification. In the drawings like numbers are used to refer to like parts and features among the various embodiments illustrated.

DETAILED DESCRIPTION OF PREFERRED EMBODIMENTS

Master Valve

Figure 1:
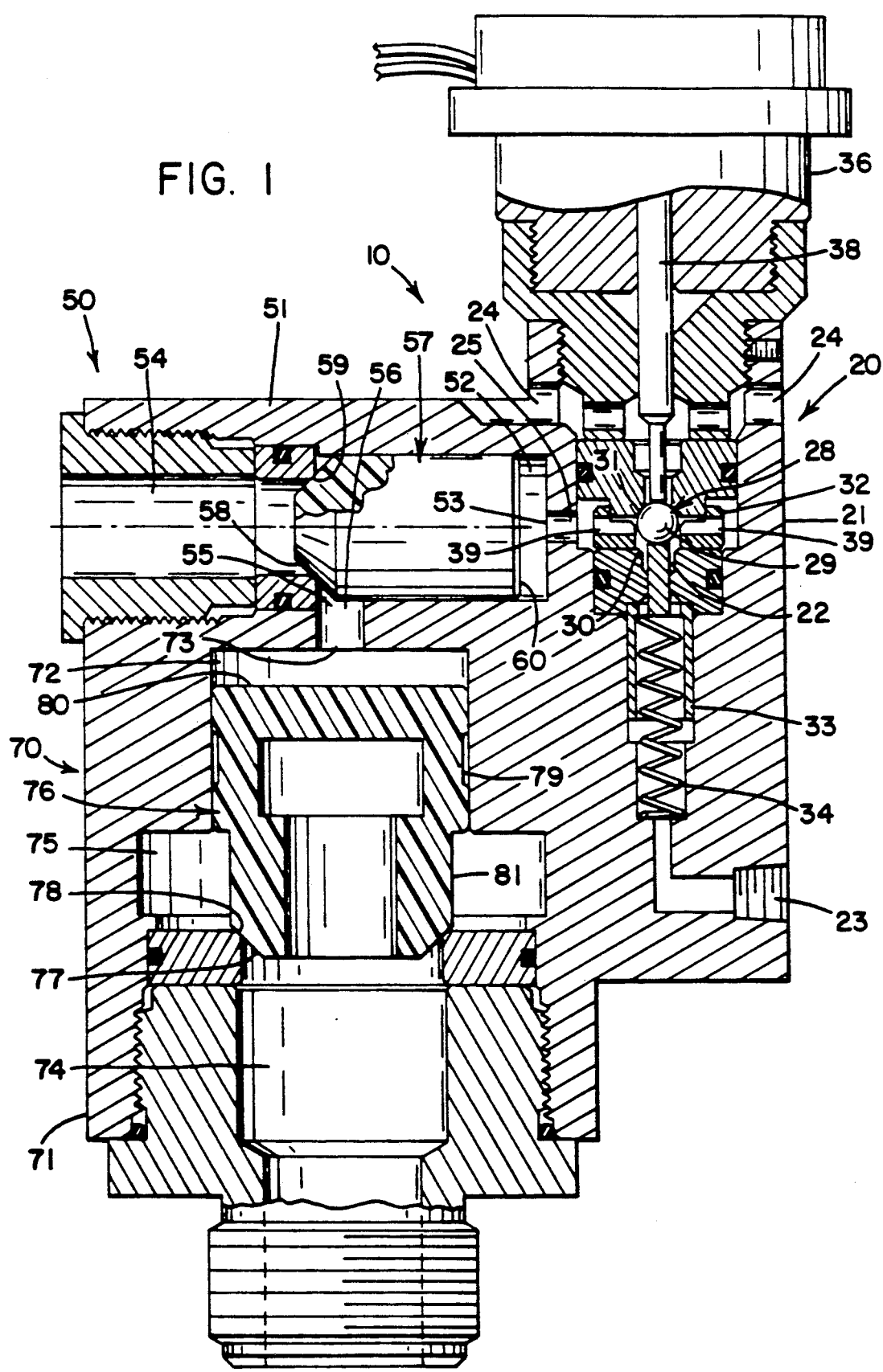
FIG. 1 is a side elevational view in partial cross section of a master valve useful in a system according to the invention.

Referring to FIG. 1, a three-stage valve 10 including a pilot section 20, an intermediate section 50 and an output section 70 is depicted. Valve 10 is useful as a master valve in a separation system to be hereinafter described. The pilot section 20 includes a pilot housing 21 which contains a pilot cavity 22. Inlet conduit means 23 extends from the exterior of the pilot housing 21 to the pilot cavity. Exhaust conduit means 24 extends from pilot cavity 22 to the exterior of the pilot housing. Intermediate conduit means 25 extends from the pilot cavity 22 and terminates in inlet port 53 of the intermediate cavity 52. Pilot section 20 also includes gate means 28 which are configured for movement from a load position as shown in FIG. 1 during which the inlet conduit means 23 is in fluid communication with said intermediate conduit means 25 and a dump position (not shown) during which the exhaust conduit means 24 is in fluid communication with said intermediate conduit means 25. When gate means 28 is in dump position, the inlet conduit means 23 is sealed off and disconnected from intermediate conduit means 25. In the preferred embodiment shown gate means 28 includes a ball 29 of stainless steel which is urged upwardly into load position by plunger 33 and spring 34 into contact with the annular seat 31 of exhaust conduit means 24 during the load portion of the valve operating cycle.

In valve 10, a conventional electrical solenoid 36 is affixed to the pilot section 20 of valve 10, such that core rod 38, when the solenoid is not energized, has its end positioned just above ball 29. Upon energization of the solenoid 36 core rod 38 is driven downwardly and forces ball 29 downwardly off exhaust conduit seat 31 and onto inlet conduit seat 30. Spacer 32 serves to constrain the movement of the ball in line between seats 30 and 31. Spacer 32 includes a plurality of radially extending passages 39 to facilitate passage of fluid between the pilot cavity 22 and intermediate conduit means 25. Spacer 32 and the upward end of plunger 33 are configured to enable fluid flow from inlet conduit means 23 into pilot cavity 22 through inlet conduit seat 30.

In valve 10, intermediate section 50 includes an intermediate housing 51 which may be integral as shown with the housing of pilot section 20 and output section 70. The intermediate section 50 includes an intermediate cavity 52 which has an inlet port 53 that is in fluid communication with the intermediate conduit means 25. At the opposite end of the intermediate cavity is annular poppet seat 59 which opens into exhaust vent 54. Proximate to exhaust vent 54 is an outlet port 55 which extends at substantially a right angle to the common axial center line of the cylindrical intermediate cavity 52 and exhaust vent 54. A cylindrical poppet 57 is reciprocally contained within intermediate cavity 52. Poppet 57 is configured for movement from a load position as shown in FIG. 1 to a dump position (not shown) during which poppet is shifted to a position away from poppet seat 59, that is toward the right with respect to the view shown in FIG. 1. Poppet 57 includes a frustoconical end face 58 capable of sealing against movement of fluid into exhaust vent 54 when in contact with annular poppet seat 59. Poppet is shown in FIG. 1 in its load position during which fluid under pressure may enter intermediate cavity 52 by coursing through inlet conduit means 23, pilot cavity 22, and intermediate conduit means 25. Poppet 57 has an outside diameter very slightly less than the inside diameter of cylindrical intermediate cavity 52. No sealing rings are provided on poppet 57. This close fitting of poppet 57 to intermediate cavity 52 provides sealing against fluid flow under dynamic conditions existent during the opening or dump portion of the valve 10 operating cycle while under static conditions existent during the load portion of the valve 10 operating cycle fluid may flow through the restrictive annular clearance between poppet 57 and the interior walls of intermediate cavity 52 into outlet port 55 and output conduit means 56.

In valve 10, output section 70 includes an output housing 71 which may be common with that of intermediate section 50 and pilot section 20 as shown. The output section includes an output cavity 72 having an inlet orifice 73 in fluid communication with output conduit means 56, and an outlet 74 at the opposite end of output cavity 72. An accumulation chamber 75 of predetermined volume proximate to outlet 74 is open to the output cavity 72. The end of the cylindrical output cavity 72 adjacent the outlet 74 includes an annular piston seat 78. Cylindrical piston 76 includes a frustoconical end face 77 capable of sealing against flow of fluid under pressure from accumulation chamber 75 and output cavity 72 when end face 77 is in contact with piston seat 78. Piston 76 has an outside diameter very slightly less than the inside diameter of output cavity 72. No sealing rings are provided on piston 76. This close fitting of piston 76 to output cavity 72 provides sealing under dynamic conditions existent during the opening or dump portion of the valve operating cycle while under static conditions existent during the load portion of the valve operating cycle permits flow of fluid under pressure through the annular clearance opening between piston 76 and the cylindrical output cavity wall into accumulation chamber 75. Piston 76 is contained within output cavity 72 and configured for movement from a load position as shown in FIG. 1 to a dump position (not shown) during which the piston is displaced away from piston seat 78 and toward the inlet orifice 73. When in load position, fluid under pressure may enter the output cavity 72 through inlet orifice 73 and fill accumulation chamber 75 by passing through the annular clearance between piston 76 and the cylindrical wall of output cavity 72. When in dump position, fluid under pressure in accumulation chamber 75 is free to exit through the annular opening between the frusto-conical end face 77 of piston 76 and piston seat 78 into outlet 74.

Alternate Master Valve

Figure 2:
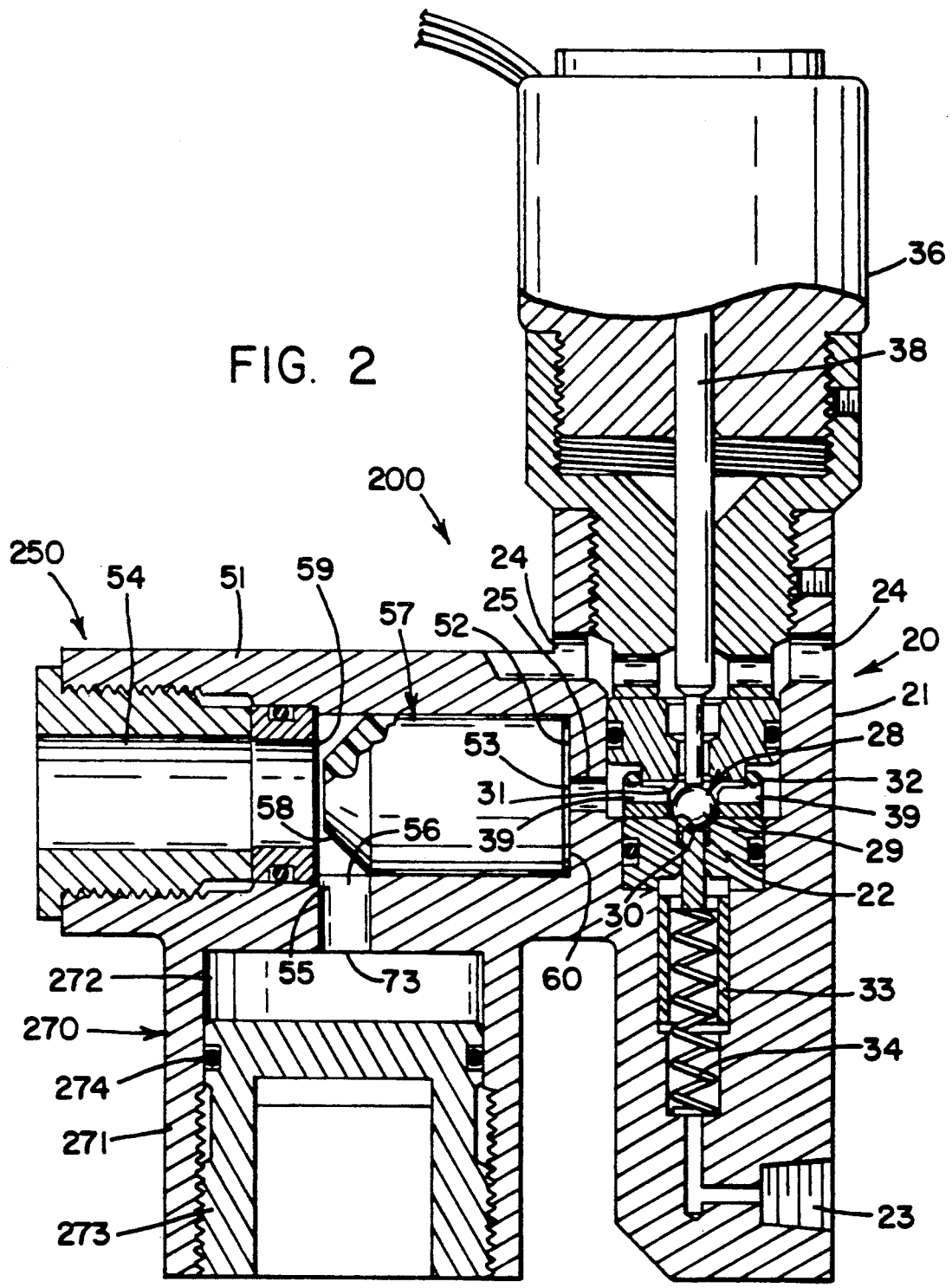
FIG. 2 is a side elevational view in partial cross section of an alternate embodiment of a valve according to the invention.

Referring to FIG. 2, a two-stage valve 200 including a pilot section 20, and an output section 250 is depicted. The pilot section 20 may be identical to that described with reference to valve 10 shown in FIG. 1. Pilot section 20 includes a pilot housing 21 which contains a pilot cavity 22. Inlet conduit means 23 extends from the exterior of the pilot housing 21 to the pilot cavity 22. Exhaust conduit means 24 extends from pilot cavity 22 to the exterior of the pilot housing. Intermediate conduit means 25 extends from the pilot cavity 22 and terminates in inlet port 53 of the intermediate cavity 52. Pilot section 20 also includes gate means 28 which are configured for movement from a load position (like that shown in FIG. 1) during which the inlet conduit means 23 is in fluid communication with said intermediate conduit means 25 and a dump position (as shown in FIG. 2) during which the exhaust conduit means 24 is in fluid communication with said intermediate conduit means 25. When gate means 28 is in dump position, the inlet conduit means 23 is sealed off and disconnected from intermediate conduit means 25. In the preferred embodiment shown in FIG. 2 gate means 28 includes a ball 29 of stainless steel which is urged upwardly into load position by plunger 33 and spring 34 into contact with the annular seat 31 of exhaust conduit means 24 during the load portion of the valve 200 operating cycle.

In valve 200, a conventional electrical solenoid 36 is affixed to the pilot section 20 of valve 200, such that core rod 38, when the solenoid is not energized, has its end positioned just above ball 29. Upon energization of the solenoid 36 core rod 38 is driven downwardly and forces ball 29 downwardly off exhaust conduit seat 31 and onto inlet conduit seat 30. In FIG. 2, the solenoid 36 is shown in its energized position. Spacer 32 serves to constrain the movement of the ball in line between seats 30 and 31. Spacer 32 includes a plurality of radially extending passages 39 to facilitate passage of fluid between the pilot cavity 22 and intermediate conduit means 25. Spacer 32 and the upward end of plunger 33 are configured to enable fluid flow from inlet conduit means 23 into pilot cavity 22 through inlet conduit seat 30.

In valve 200, intermediate section 250 includes an intermediate housing 51 which may be integral as shown with the housing of pilot section 20 and adjustable accumulation section 270. The intermediate section 250 includes an intermediate cavity 52 which has an inlet port 53 that is in fluid communication with the intermediate conduit means 25. At the opposite end of the intermediate cavity 52 is annular poppet seat 59 which opens into exhaust vent 54. Proximate to exhaust vent 54 is an outlet port 55 which extends at substantially a right angle to the common axial center line of the cylindrical intermediate cavity 52 and exhaust vent 54. A cylindrical poppet 57 is reciprocally contained within intermediate cavity 52. Poppet 57 is configured for movement from a load position (like that shown in FIG. 1) to a dump position (as shown in FIG. 2) during which the poppet is shifted to a position away from poppet seat 59, that is toward the right with respect to the view shown in FIG. 1. Poppet 57 includes a frusto-conical end face 58 capable of sealing against movement of fluid into exhaust vent 54 when in contact with annular poppet seat 59. Poppet 57 is shown in FIG. 1 in its load position during which fluid under pressure may enter intermediate cavity 52 by coursing through inlet conduit means 23, pilot cavity 22, and intermediate conduit means 25. Poppet 57 has an outside diameter very slightly less than the inside diameter of cylindrical intermediate cavity 52. No sealing rings are provided on poppet 57. This close fitting of poppet 57 to intermediate cavity 52 provides sealing against fluid flow under dynamic conditions existent during the opening or dump portion of the valve 200 operating cycle while under static conditions existent during the load portion of the valve 200 operating cycle fluid may flow through the restrictive annular clearance between poppet 57 and the interior walls of intermediate cavity 52 into outlet port 55 and output conduit means 56.

In valve 200, accumulation means 270 includes an accumulator housing 271 which as shown may be integral with that of intermediate section 250 and pilot section 20. The accumulation means 270 includes an accumulation cavity 272 having an orifice 73 in fluid communication with accumulator conduit means 56. An externally threaded cylindrical plug 273 is retained by the mating internal threads of housing 271 and sealed against fluid leakage by O-ring 274. The internal volume of the accumulation means may be reduced by threading plug 273 further into housing 271 toward orifice 73 or increased by rotating plug 273 in the opposite direction away from orifice 73.

In another embodiment, not illustrated, an accumulation means is in the configuration of an annular chamber surrounding and co-axial with poppet 57. Such co-axial accumulation means may be made variable in volume by forming the housing of the intermediate section of threaded overlapping coaxial tubular sections sealed with an O-ring.

Figure 3:
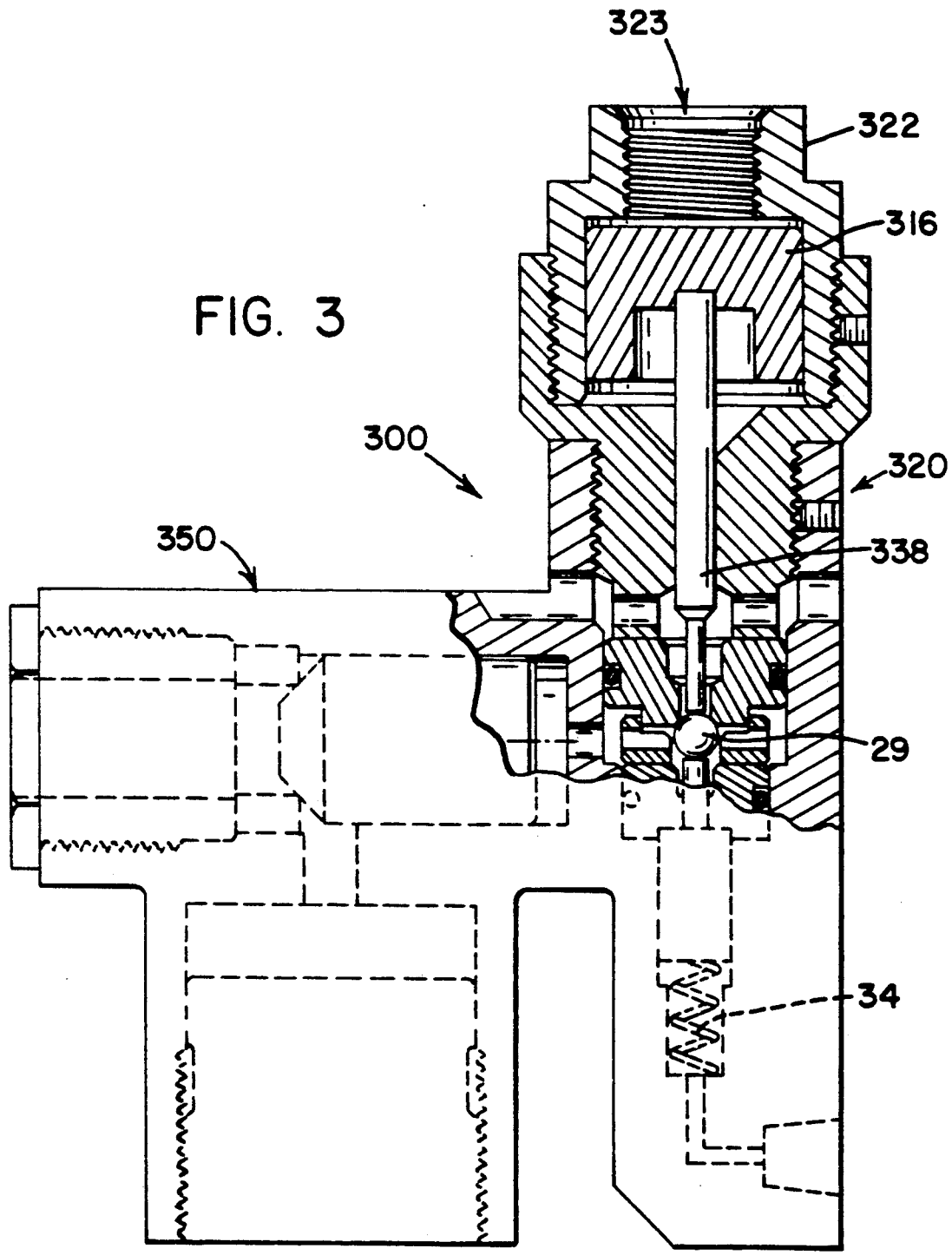
FIG. 3 is a side elevational view in partial cross section of another embodiment of a valve according to the invention.

Referring to FIG. 3, a two-stage fluid operated valve 300 including pilot section 320 and intermediate section 350 is illustrated. Except for the means provided for actuation of rod 338, valve 300 may be identical in construction to valve 200 depicted in FIG. 2. In valve 300, pilot section 320 includes pilot piston 316 reciprocably retained within pilot cylinder 322. Introduction of fluid under pressure into inlet 323 forces pilot piston 316 downward which in turn drives pilot rod 338 downwardly and forces ball 29 downwardly off exhaust conduit seat 31 and onto inlet conduit seat 30. In FIG. 3, the valve 300 is shown with its parts in its load position. The remainder of valve 300 may be configured identically to that shown in FIG. 1 or FIG. 2 such that the fluid pilot section actuation means shown in FIG. 3 may be substituted for the electrical solenoid shown in FIGS. 1 and 2 by merely unscrewing one and rotating on the other.

Alternate Embodiment Fluid Actuated Two-Stage Valve

Figure 4:
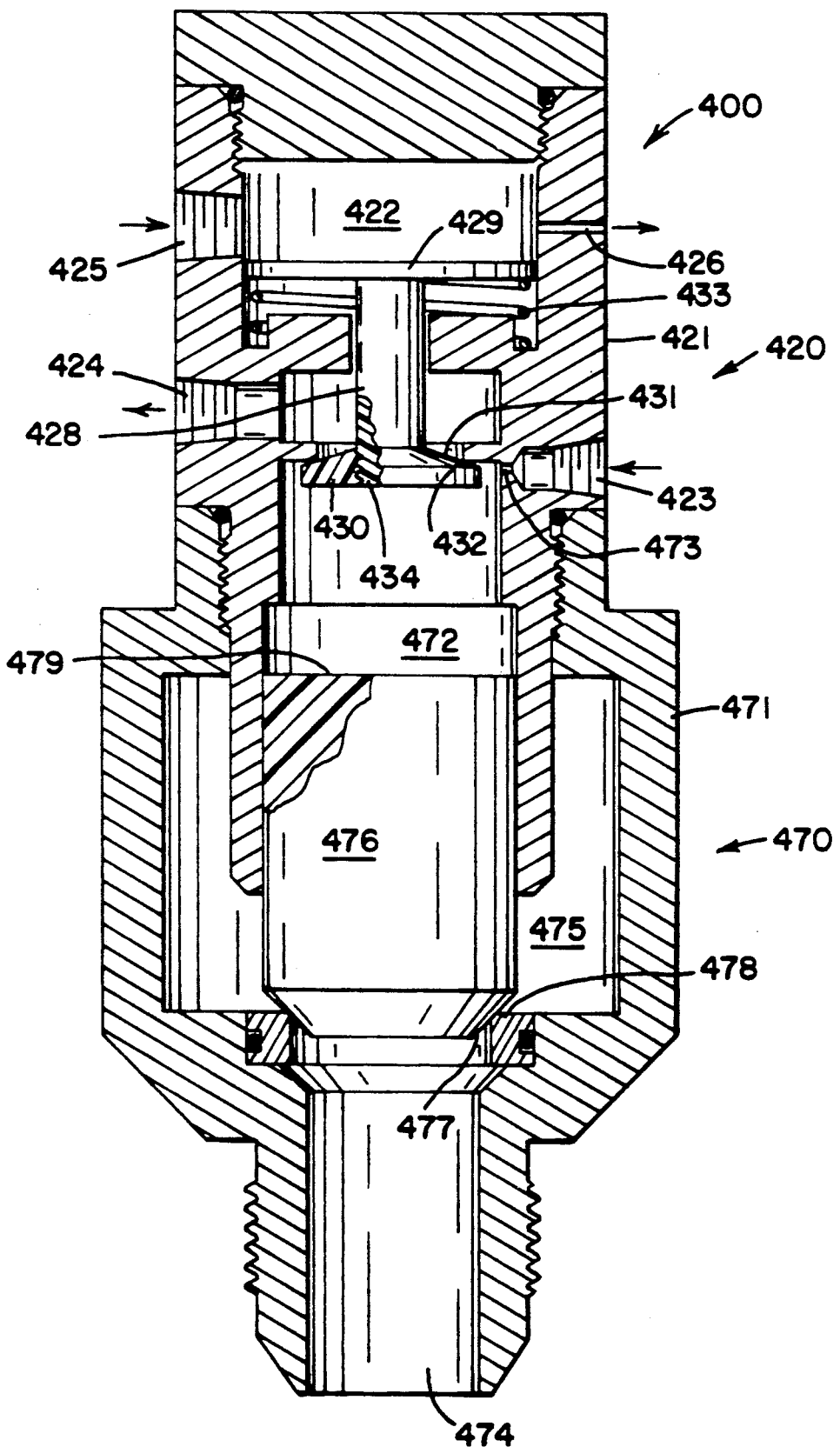
FIG. 4 is a side elevational view in partial cross section of another embodiment of a valve according to the invention.

Referring to FIG. 4, a two-stage valve 400 including a pilot section 420 and an output section 470 is depicted. The pilot section 420 includes a pilot housing 421 which contains pilot cavity 422. Pilot inlet conduit means 425 extends from the exterior of pilot housing 421 to the pilot cavity 422. Pilot exhaust conduit means 426 extends from pilot cavity 422 to the exterior of pilot housing 421. Pilot section 420 also includes gate means 428 which are configured for movement from a load position as shown in FIG. 4 during which the high pressure intermediate exhaust conduit means 424 is sealed off against fluid communication with output cavity 472. When gate means 428 is in dump position (not shown), the high pressure inlet conduit means 423 and that portion of the output cavity 472 above cylindrical output poppet 476 is in fluid communication with high pressure intermediate exhaust conduit means 424. In the preferred embodiment shown, gate means 428 includes complexly configured piston 429 of plastic material such as PEEK which is urged upwardly into load position by spring 433 and by fluid pressure bearing against bottom face 430. The frustoconical sealing face 431 of piston 429 is engaged with annular seat 432 of pilot section 420. Spring 433 initiates sealing by forcing piston 429 upwardly thereby urging frustoconical sealing face 431 into sealing engagement with annular seat 432. As fluid pressure builds within output cavity 472, the force with which frustoconical sealing face 431 is urged into contact with annular seat 432 is increased.

Upon introduction of sufficient fluid pressure into inlet conduit means 425, piston 429 is driven downwardly and forces frustoconical sealing face 431 off seat 432 allowing the accumulated fluid pressure within output cavity 472 above poppet 476 to escape via high pressure intermediate exhaust conduit means 424. Because the size of orifice 473 of high pressure inlet 423 is much smaller that that of high pressure intermediate exhaust conduit means 424, the continued supply of high pressure fluid to inlet 423 does not prevent the fluid pressure above poppet 476 from rapidly dropping by exhaustion through intermediate exhaust conduit means 424.

Still referring to FIG. 4, in valve 400 output section 470 includes an output housing 471 which may be common with that of pilot section 420. The output section 470 includes an output cavity 472 in fluid communication with high pressure inlet 423 through orifice 473, and an outlet 474 at the opposite end of output cavity 472. An accumulation chamber 475 of predetermined volume is located proximate to outlet 474 and is open to the output cavity 472. The end of the cylindrical output cavity 472 adjacent to the outlet 474 includes an annular poppet seat 478. Cylindrical poppet 476 includes a frustoconical end face 477 capable of sealing against flow of fluid under pressure from accumulation chamber 475 and output cavity 472 when the end face 477 is in contact with poppet seat 478. Poppet 476 has an outside diameter very slightly less than the inside diameter of output cavity 472. No sealing rings are provided on Poppet 476. This close fitting of poppet 476 to output cavity 472 provides sealing under dynamic conditions existent during the opening or dump portion of the valve 400 operating cycle while under static conditions existent during the load portion of the valve operating cycle permits flow of fluid under pressure through the annular clearance opening between poppet 476 and cylindrical output cavity wall into accumulation chamber 475. Poppet 476 is contained within output cavity 472 and configured for reciprocating movement from a load position as shown in FIG. 4 to a dump position (not shown) during which the poppet is displaced upwardly away from the poppet seat 478 and toward the inlet orifice 473. When in load position, fluid under pressure may enter the output cavity 472 through inlet orifice 473 and fill accumulation chamber 475 by passing through the annular clearance between poppet 476 and the cylindrical wall of output cavity 472. When in dump position, fluid under pressure in accumulation chamber 475 is free to exit through the annular opening between the frustoconical end face 477 of poppet 476 and poppet seat 478 into outlet 474.

The valve body or housing of any of the embodiments described is preferably integral as shown although separate housings may be provided for each of pilot, intermediate and output sections. The housing may be formed of aluminum or steel or other material that is structurally capable of holding the intended pressure. For use in combination with aircraft de-icing apparatus, a preferred material for the housing is aluminum. While anodization is not required to achieve effective functioning, anodization is preferred to further increase life of the housing against wear and to inhibit corrosion. A valve like the embodiment shown in FIG. 1 having a non-anodized aluminum housing and a poppet and piston of PEEK has been successfully cycled more than two million times.

The poppet 57 of the intermediate section 50 in FIGS. 1, and intermediate section 250 in FIG. 2 and intermediate section 350 in FIG. 3 and the piston 76 of the output section 70 in FIG. 1, and poppet 476 of output section 470 in FIG. 4 are preferably formed as hollow cylindrical bodies to reduce their mass to a minimum to enable fastest possible response to initiation of the dump portion of the valve operating cycle. The poppet and piston may be formed of any suitable metal or non-metal material. However, it has been found that a high performance plastic such as PEEK precludes galling and corrosion problems and thus is a highly preferred embodiment. A highly suitable combination is a poppet and/or a piston formed of PEEK (polyetheretherketone) in an aluminum housing because this combination exhibits excellent resistance to corrosion, a low coefficient of sliding friction and a good match in coefficient of thermal expansion over the temperature range for which aircraft equipment need be operational. When this combination of materials is utilized, the clearance at room temperature of the poppet and piston to their respective bores is preferably of the order of about 0.0005 inch diameter. A greater clearance will result in a slower acting valve and a lower output pressure pulse. Maximum clearance is believed to be about 0.005 inch diametrical but this has not been experimentally verified. The poppet and piston may be provided with a circumferential relief such as relief 79 shown on piston 76 in FIG. 1 to reduce machining costs associated with the close tolerances required and friction when in operation. Such relief also serves to further reduce the mass of the poppet and piston thereby increasing the rate of response when the dump portion of the valve operating cycle is initiated.

The piston 429 of the embodiment shown in FIG. 4 is preferably formed in two pieces, the lower portion which contains annular sealing face 431 is threaded onto the shank 434 of the upper portion of piston 429. Piston 429 is also preferably formed of a plastic such as PEEK. Respecting the pilot section 420, spring 433 is preferably formed of 300 series stainless steel or plated high carbon music wire to inhibit corrosion. Clearance of shank 434 the housing in which it reciprocably slides is not critical provided that reciprocal motion is not inhibited and frustoconical face is aligned with its annular seat.

Respecting the pilot section 20 in FIGS. 1 and 2, and 320 in FIG. 3, plunger spring 34 is preferably formed of 300 series stainless steel or plated high carbon music wire to inhibit corrosion. Ball 29 is preferably formed of stainless steel, preferably type 440C. Solenoid 36 may be a standard push type 28 volt DC solenoid, the only requirements being that it be dimensioned to fit to the pilot section and have an adequate motion when energized to move the ball 29 off the seat 31 of exhaust conduit means 24 and into sealing engagement with seat 30 of inlet conduit means 23.

While the poppet 57 and piston 76 and poppet 476 are shown to include a frustoconical face configured for sealing engagement with their corresponding seats, a different configuration could be employed such as an annular shoulder or step-down region (not illustrated) and a corresponding sealing surface on the seat. An 0-ring could be affixed to the poppet or piston or its corresponding seat to provide the requisite seal when engaged. These alternates are not as preferred as those illustrated and described in detail because they lack the positive aerodynamic spring rate upon opening which is provided by the frustoconical sealing faces of the poppet and pistons.

While the invention has been described in regard to a valve according to the embodiment shown in FIG. 1 having three sections, four or more sections could be employed to achieve even faster dump response time of the final output section, dump response time being defined as the time required for the output section piston to go from full-closed to full-open position. In the embodiment illustrated, dump response times of less than 0.01 second are easily obtained and time required for the piston to go from full-closed to full-open position of 0.001 second and less have been achieved, for example about about 0.0005 second with a $C_v$ of about 5. In analogous manner, the embodiments shown in FIGS. 2 and 3 may be modified to include three or more sections to achieve faster dump response time of the final section.

Dump cycle time, defined as the time elapsed between movement of pilot section gate means such as gate means 28 in FIG. 1 from its load position to its dump position, e.g. by energization of solenoid 36, and initiation of release of a pulse of pressurized fluid from the accumulator means 75 into outlet 74, is also extremely rapid. For embodiments like that illustrated in FIG. 1, dump cycle times of less than 0.01 second are easily obtained and dump cycle times of less than 0.005 second have been achieved. In the embodiment illustrated in FIG. 1, counting elapsed time beginning with the instant that solenoid 36 is energized, less than 0.004 seconds elapse until a pulse of the pressurized fluid into outlet 74 from the accumulator means 75 is initiated.

Each of the embodiments depicted in FIGS. 2 and 3, contains only two stages. As with the embodiment shown in FIG. 1, extremely short dump response times are easily obtained. Dump cycle times are believed to be comparable for that of the embodiment shown in FIG. 1. The embodiment shown in FIG. 2 may not be as well suited as the embodiments shown in FIGS. 1, 3 and 4 where high output section pressures, e.g. greater than 500 psig, are anticipated because the solenoid required to initiate dumping becomes increasingly large, heavy and costly as the operating pressure increases.

OPERATION OF VALVE EMBODIMENTS

The valves and separation system of the invention are most useful when coupled to a source of compressible fluid at a pressure substantially above atmospheric pressure. Typically, this fluid pressure is at least 500 psig and may be 5,000 psig or more as desired for the intended application.

In use valve 10 while in its load position as illustrated in FIG. 1 becomes pressurized throughout inlet conduit means 23, pilot cavity 22, intermediate conduit means 25, inlet port 53, intermediate cavity 52, outlet port 55, output conduit means 56, inlet orifice 73, output cavity 72, and accumulation chamber 75. Fluid under pressure is able to flow into output cavity 72 and accumulation chamber 75 because a diametrical clearance is provided between poppet 57 and the cylindrical wall of intermediate cavity 52 and between the cylindrical surface of piston 76 and the cylindrical wall of output cavity 72. Typically, this pressure at inlet conduit means 23 is at least 500 psig and may be as high as 5,000 psig or more as desired for the intended application. Ball 29 is in sealing contact with annular seat 31 of exhaust conduit 24 thereby preventing loss of pressure from inlet conduit means 23 or intermediate conduit means 25.

The dump portion of the operational cycle of the embodiment shown in FIG. 1 begins with energization of solenoid 36. Energization of solenoid 36 forces core rod 38 downwardly against ball 29, driving ball 29 away from exhaust conduit seat 31 downward and into sealing engagement with seat 30 of inlet conduit 23. This opens pilot cavity 22 to exhaust conduit means 24 and seals off inlet conduit means 23 from pilot cavity 22. The fluid pressure in the intermediate cavity 52 begins to reduce by exhaustion through intermediate conduit means 25, pilot cavity 22 and exhaust conduit means 24. As the pressure acting on the end of the poppet 57 nearest the intermediate conduit means 25 diminishes and thereby leaves fluid pressure in the output conduit means 56 and output cavity 72 much more elevated than the fluid pressure acting on the flat end 60 of poppet 57, this pressure differential causes the frustoconical end face 58 of poppet 57 to unseat poppet 57 from the poppet seat 59 and thereby discharges pressurized fluid from the output cavity 72 between the flat end face 80 of piston 76 through exhaust vent 54. Reduced pressure upon the flat end face 80 of piston 76 leaves the fluid pressure in accumulation chamber 75 much more elevated than that acting on flat end face 80 and this pressure differential acts upon the frustoconical end face 77 and reduced diameter region 81 of piston 76 to lift the piston from piston seat 78 thereby enabling the fluid pressure in accumulator chamber 75 to be discharged into outlet 74.

As the poppet 57 and piston 76 begin to lift from their respective seats 59 and 78, a greater area of their respective frustoconical end faces 58 and 77 is subjected to the fluid pressure differential. This configuration provides what has been referred to as a positive aerodynamic spring rate which causes increasingly rapid acceleration of the poppet 57 and piston 76 as they move away from their respective seats 59, 78 to full-open position at the opposite end of their respective cylindrical cavities 52, 72. Because the annular clearance between the poppet 57 and the cylindrical wall of its intermediate cavity 52 and the piston 76 and the cylindrical wall of the output cavity 72 are very small, little fluid pressure drop occurs due to reverse flow under these dynamic conditions.

After dumping and return of pilot section 20 gate means 28 to its load position as shown in FIG. 1, fluid pressure in accumulation chamber 75 is restored to about equal to that at inlet conduit means 23 in a short time, typically less than one second for the embodiment illustrated with an inlet pressure of 1500 psig and an accumulation chamber 75 volume of about one cubic inch.

Operation of the embodiment shown in FIG. 2 is like that described for the pilot section and intermediate section of the embodiment illustrated in FIG. 1, except that fluid under pressure is able to flow into the accumulator chamber 272 and is stopped from flowing out the valve by plug 273 and annular sealing ring 274. The dump portion of the operational cycle of the embodiment depicted in FIG. 2 is identical to that described with regard to operation of the embodiment depicted in FIG. 1 except that the pressure acting on the end of the poppet 57 nearest the intermediate conduit means 25 diminishes, thereby leaving fluid pressure in the output conduit means 56 and accumulator chamber 272 much more elevated than the fluid pressure acting on the flat end 60 of poppet 57. This pressure differential causes the frustoconical end face 58 of the poppet 57 to unseat poppet 57 from poppet seat 59 and thereby discharges the pressurized fluid from the accumulator chamber 272 into exhaust vent 54.

Operation of the embodiment depicted in FIG. 3 is essentially identical to that of the embodiment depicted in FIG. 2 except that the dump portion of the operational cycle begins with introduction of fluid under pressure into inlet 323 which drives piston 316 downwardly and with it rod 338 downwardly against ball 29. In all other respects, the operation of the remaining parts of the embodiment depicted in FIG. 3 are identical to that of the embodiment depicted in FIG. 2. When the fluid pressure previously introduced at inlet 323 is abated, piston 316 and rod 338 and ball 29 move upwardly by means of spring 34 to return the valve 300 to the load portion of its operational cycle.

Operation of the embodiment depicted in FIG. 4 is as follows. In use, the accumulation chamber 475 of valve 400, while in its load position, as illustrated in FIG. 4, becomes pressurized through introduction of fluid through high pressure inlet conduit means 423, inlet orifice 473, and output cavity 472. Fluid under pressure is able to flow into the accumulation chamber 475 because a small diametrical clearance is provided between piston 476 and the cylindrical wall of the output cavity 472. Typically, this pressure at inlet conduit means 423 is at least 500 psig and may be as high as 5000 psig or more as required or desired for the intended application. The fluid under pressure within output cavity 472 also acts on piston 429 to urge sealing face 431 into engagement with seat 432. Initial engagement of sealing faces 431 and 432 is aided by the action of spring 433 against the underside of the upper portion of piston 429.

The dump portion of the operational cycle of the embodiment shown in FIG. 4 begins with introduction of low pressure fluid into inlet 425 which drives piston 429 downwardly, thereby moving frustoconical sealing face 431 away from annular seat 432. The fluid pressure in that portion of the output cavity 472 which is above the upper end 479 of piston 476 begins to reduce by exhaustion through high pressure intermediate outlet 424. As the pressure acting on the upper end 479 of the piston 476 nearest annular sealing faces 431 and 432 diminishes, and thereby leaves fluid pressure in the accumulation chamber 475 much more elevated, this pressure differential causes the frustoconical end face 477 of piston 476 to unseat piston 476 from piston seat 478 and thereby discharges pressurized fluid from the accumulation chamber 475 through the annular opening between the frustoconical face 477 and annular Piston seat 478. The fluid pressure in accumulator chamber 475 is thereby discharged into outlet 474. Because the annular clearance between piston 476 and the cylindrical wall of output cavity 472 is very small, little fluid pressure drop occurs due to reverse flow under these dynamic conditions. The configuration of frustoconical face 477 provides a positive dynamic spring rate upon discharge of accumulator chamber 475 into outlet 474.

After dumping of the high pressure fluid contained in the accumulator chamber 475, and the release for exhaustion of the low pressure fluid introduced into inlet 425, for example, by its exhaustion to atmosphere through low pressure conduit 426 (or reverse flow through inlet 425), spring 433 returns piston 429 to its upward limit of movement and causes frustoconical sealing face 431 to sealingly engage annular seat 432. Continued application of high pressure fluid to inlet 473 causes piston 476 to again engage seat 478 and output cavity 472 and accumulator chamber 475 to become repressurized in a relatively short time, typically less than one second for the embodiment illustrated with an inlet pressure of 1500 psig with an accumulator chamber volume of about one cubic inch.

Although the invention has been described with reference to certain preferred embodiments, it is apparent to persons skilled in the art that other variations in the valves of the invention are obvious and these are intended to be encompassed by the present specification and claims. The devices could be formed with a different orientation of their sections. For example, the output section of FIGS. 1 and 2 could be turned 180° to be beside the solenoid or at 90° to extend into or out of the page of FIGS. 1 and 2. The accumulator chamber could be larger or smaller, it could have a different shape, or it could be connected to an external chamber or conduit. A manual actuator, pneumatic actuator or a hydraulic actuator or a camming device could be employed rather than a solenoid. The poppet and piston need not be hollow nor need they have conical sealing faces as shown and described. O-rings or other sealing rings could be employed on the poppet and piston and restricted passages could be provided to enable pressurization of the intermediate and output sections such as, for example, a small passageway extending through the piston body from the upstream portion of the intermediate cavity to the upstream portion of the output cavity. Referring to FIG. 4, conduit means 426 can be eliminated where reverse flow through inlet 425 is permitted in a controlled fashion.

Figure 5:
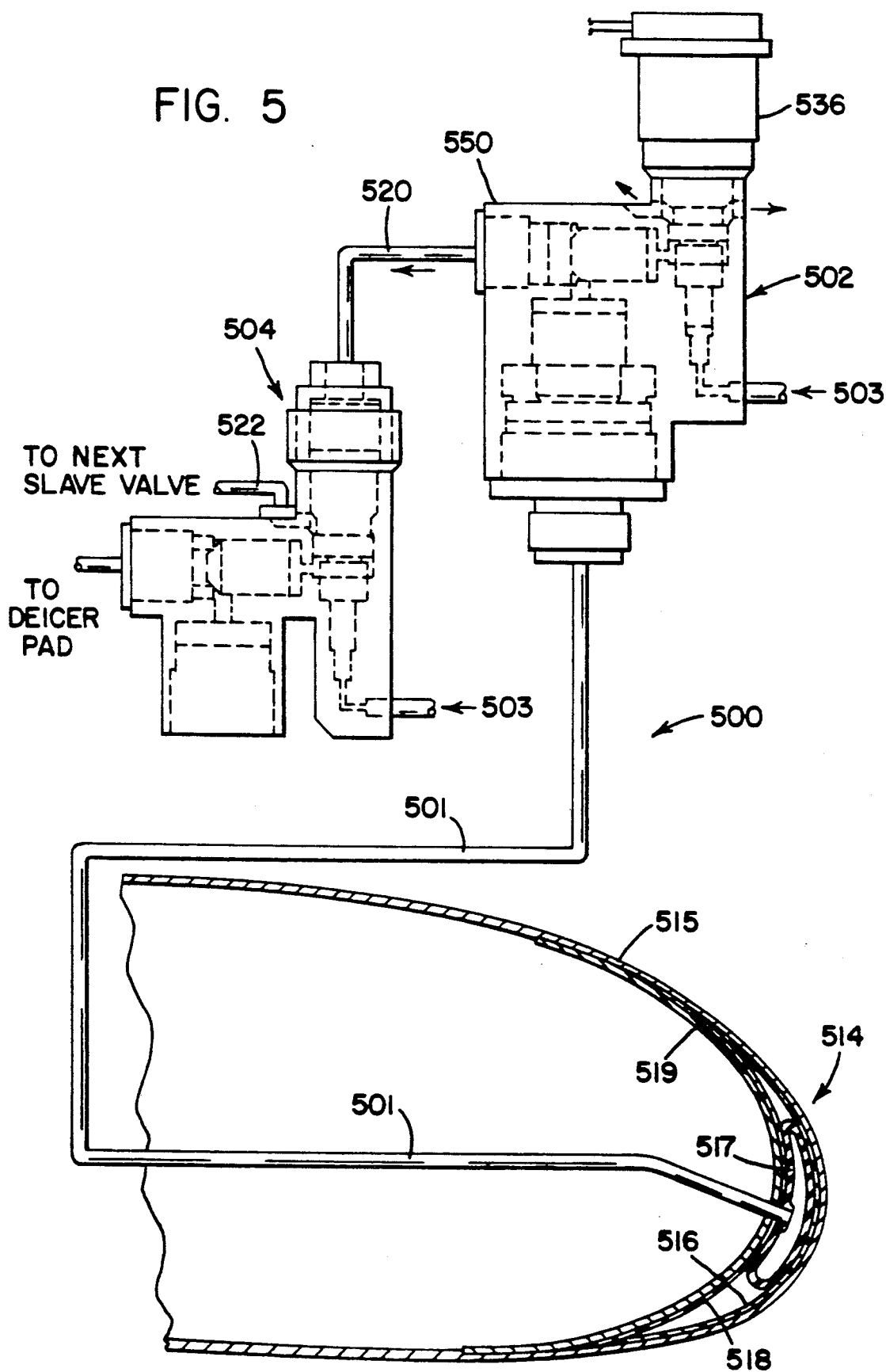
FIG. 5 is combined schematic and sectional view of valves and a fluid impulse separation apparatus according to the invention.

Referring now to FIG. 5, there is shown a fluid impulse separation system 500 generally. The fluid impulse separation system 500 comprises a fluid impulse valves 502 and 504 and associated conduit means, and fluid impulse separation apparatus 514. Fluid under pressure is supplied through conduit means 503 to the pilot stages of master valve 502 and slave valve 504. As used herein, a master valve whose actuation initiates actuation of one or more valves whose actuators are joined by conduit means to one or more output ports of the master valve. Conduit means 501 joins the output section of master valve 502 which is like the solenoid-operated valve as shown in FIG. 1 which provides fluid under pressure from one of its exhaust ports to a slave valve such as fluid operated valve shown in FIG. 3 or FIG. 4, and from another of its exhaust ports to a fluid impulse separation apparatus which in the embodiment illustrated is an airfoil such as a wing or stabilizer of an aircraft. In the embodiment illustrated, fluid impulse separation apparatus 514 comprises an outer surface layer or skin 515 having the shape of an airfoil, and bonding layer 516 bonded to the obverse of skin 515, and fabric reinforced inflatable tube 517 and a polymeric base layer 518. Base layer 518 is utilized for bonding the illustrated structure just described to a rigid backing such as the underlying support structure 519 of the airfoil. The material of skin 515 has a Young's modulus of at least 40,000 kPa and preferably at least 275,000 kPa. In certain preferred embodiments skin 515 is formed of metal selected from titanium and its alloys, aluminum and its alloys, magnesium and its alloys and stainless steels. Further detailed description of suitable fluid impulse separation apparatuses is contained in U.S. Pat. Nos. 4,747,575 and 4,706,911, the teachings of which are herein incorporated by reference.

Having continued reference to FIG. 5, the output of the intermediate section 550 of master valve 502 is joined by conduit means 520 to the fluid actuator inlet of the pilot stage of slave valve 504 which is of construction like valve 300 depicted in FIG. 3. Energization of solenoid 536 of master valve 502 initiates dumping of the intermediate stage 550 output into conduit means 520 which initiates dumping of slave valve 504. A slave valve is a fluid-actuated valve which is actuated by and following actuation of a master valve. A valve 400 like that depicted in FIG. 4 could be substituted for valve 300 shown in FIG. 3. The output of the pilot section of valve 504 is joined by conduit means 522 to the low pressure input of the pilot section of another slave valve (not illustrated). Using such a series arrangement, there is no limit to the number of slave valves whose dump cycle may be sequentially initiated upon initiating the dump cycle of the master valve. It is also possible to join a plurality of serially arranged strings of slave valves to a manifold (not shown) attached to an output of the master valve.

Figure 6:
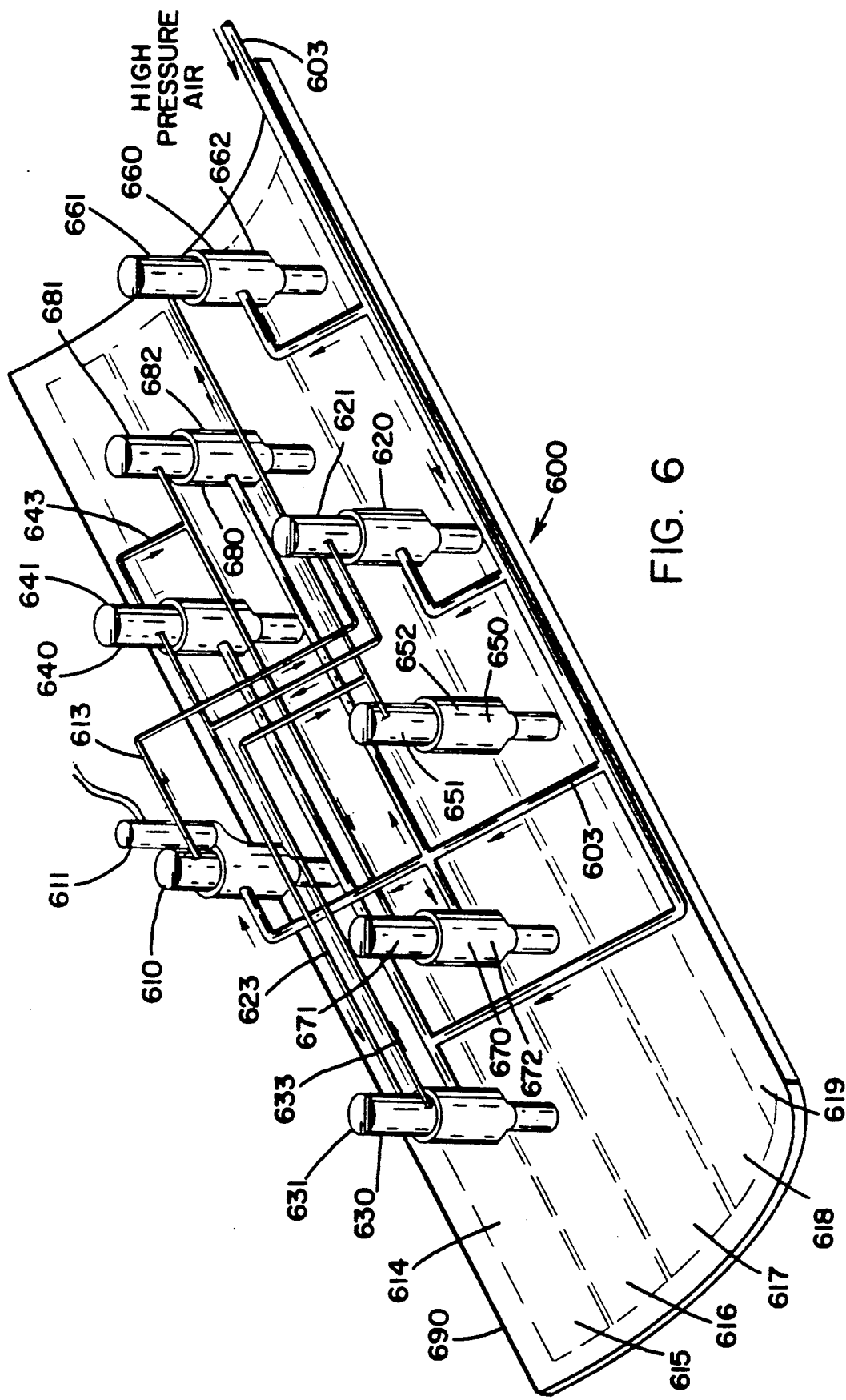
FIG. 6 is a schematic view of combined valves and conduit network and fluid impulse separation apparatus according to the invention.

Having reference to FIG. 6, there is shown the backside of a fluid impulse separation system 600 generally. The fluid impulse separation system 600 comprises master fluid impulse valve 610, slave valves 620, 630, 640, 650, 660, 670 and 680 and associated conduit means. In this manner an airfoil 690 having a long span may be deiced in a predetermined sequence upon actuating a single master valve 610. Master valve 610 and each of slave valves 620, 630, 640, 650, 660, 670 and 680 is connected to a source of high pressure air (not illustrated) by conduit means 603. The high pressure output at the base of each valve is connected to a fluid impulse separation apparatus 614 having multiple inflatable impulse tubes 615, 616, 617, 618 and 619. One or more of such inflatable impulse tubes may be connected to a single valve. As shown in FIG. 6, the high pressure output at the base of master valve 610 discharges into impulse tube 615. The high pressure output at the base of slave valves 630 and 640 discharges into impulse tube 616. The high pressure output at the base of slave valves 670 and 680 discharges into impulse tube 617. The high pressure output at the base of slave valves 650 and 660 discharges into impulse tube 618. The high pressure output at the base of slave valve 620 discharges into impulse tube 619. In FIG. 6 energization of solenoid 611 of first tier master valve 610 causes release of pressure from intermediate stage 612 into conduit means 613 and delivery of a high pressure pulse to impulse tube 615. The opposite end of conduit means 613 is operably connected to the pilot stage of second tier slave valve 620. The fluid impulse from master valve 610 initiates dumping of slave valve 620. The output from the pilot section 621 of slave valve 620 is conducted through conduit means 623 simultaneously to the pilot sections 631 and 641 of respective slave valves 630 and 640. The output of pilot section 631 of slave valve 630 is conducted through conduit means 633 to the respective pilot sections 651, 661 of slave valves 650, 660 and initiates dumping of their respective output sections 652, 662 at spaced apart locations into fluid impulse tube 618. The output of pilot section 641 of slave valve 640 is conducted through conduit means 643 to the respective pilot sections 671, 681 of slave valves 670, 680 and initiates dumping of their respective output sections 672, 682 at spaced apart locations into fluid impulse separation tube 617. Thus initiation of dumping of master valve 610 results in sequential dumping of the slave valves in the order in which they are operably coupled. In FIG. 6 the order of inflation of fluid impulse separation tubes of apparatus 614 is 615, 619, 616, followed by 618 and 617 which will be energized near simultaneously, dependent upon the response time of slave valves 630, 640, 650, 660, 670, 680 and the relative length of the conduit means connecting their respective pilot sections. The high pressure output of each valve having an accumulator capacity of about one cubic inch is believed to be able to effectively inflate ten to twelve feet of a single impulse tube deicing apparatus. The impulse tubes may extend in the spanwise direction of the airfoil as shown in FIG. 6, or in the chordwise direction as in combinations of spanwise, chordwise and oblique directions (not shown). As used herein, oblique direction means in a direction that is neither spanwise or chordwise but between these. The high pressure output of the master valve or any slave valve may be connected to a fluid impulse separation apparatus positioned adjacent to and spanwise inboard or outboard of separation apparatus 614 shown, or to separation apparatus positioned above or below, or directly behind the leading edge centerline as is separation apparatus 514 in FIG. 5.

The two-stage valves described and illustrated herein, and especially the embodiment shown in FIG. 2 are also particularly useful where operating pressures less than 1000 psig are to be employed.

Examples of applications for the valves of the present invention include in a nail gun, a launcher such as is used to test the resistance of aircraft turbine engines to bird ingestion, a sports ball launcher to be used in the practice of tennis or baseball, an ice cannon, as a part of the control and activation mechanism of an impact die cutting or forming machine, or to inflate a safety restraint airbag or flotation device.

While preferred embodiments of the invention have been shown and described in detail, it should be apparent that various modifications may be made thereto without departing from the scope of the claims that follow.

What is claimed is:

1. A valve consisting essentially of pilot and output sections,
   the pilot section including a pilot housing containing a pilot cavity, inlet conduit means extending from the exterior of the pilot housing to the pilot cavity, exhaust conduit means extending from the pilot cavity to the exterior of the pilot housing, and intermediate conduit means extending from the pilot cavity to said output section, gate means configured for movement from a load position during which the inlet conduit means is in fluid communication through said pilot cavity with said intermediate conduit means and said exhaust conduit means is sealed off from fluid communication with said intermediate conduit means by said gate means, and a dump position during which the exhaust conduit means is in fluid communication through said pilot cavity with said intermediate conduit means while said inlet conduit means is disconnected from said intermediate conduit means; and
   the output section including an output housing containing an output cavity having an inlet port in fluid communication with said intermediate conduit means, an exhaust vent, and an outlet port in fluid communication with output conduit means and accumulation means, the outlet port being proximate to the exhaust vent, and a poppet contained within said output cavity configured for movement from a load position during which fluid under pressure may enter the output cavity and force the poppet to seal off movement of fluid into the exhaust vent while permitting flow of fluid to the outlet port and a dump position during which fluid under pressure may flow from said accumulation means through said output conduit means to said vent.

2. The valve of claim 1 further including solenoid operably connected to the pilot section for movement of said gate means between its load and dump positions, said gate means being configured to forcibly seal off said exhaust conduit means upon introduction of fluid under pressure into said inlet conduit means.

3. The valve of claim 1 further including a fluid actuator operably connected to the pilot section and configured to effect movement of said gate means from its load position to its dump position upon introduction of fluid under pressure into said fluid actuator.

4. In combination, a valve according to claim 3 and fluid impulse separation apparatus comprising an outer surface layer having a Young's modulus of at least 275,000 kPa and at least one inflatable tubular member positioned beneath the outer surface layer such that fluid impulse inflation of said tubular member causes reaction movement of said outer surface layer.

5. The valve of claim 1 wherein said pilot section includes a pilot cavity, said inlet conduit means, said exhaust conduit means and said intermediate conduit means each being operably connected to said pilot cavity, said pilot cavity containing said gate means comprising a ball movable from a load position during which the ball permits movement of fluid from said inlet conduit means into said intermediate conduit means and a dump position during which the ball prevents movement of fluid from said inlet conduit means into said intermediate conduit means while permitting movement of fluid from said intermediate conduit means to said exhaust conduit means.

6. The valve of claim 5 further including a solenoid operably connected to said pilot section, the solenoid core rod moving the ball from its load position to its dump position when energized.

7. The valve of claim 6 wherein the poppet and output cavity are of cylindrical shape and the poppet outside diameter is closely fitted to the inside diameter of the output cavity, one end of the output cavity containing said inlet port, the opposite end of said output cavity containing a circular poppet seat opening into said exhaust vent, the end of the poppet facing the poppet seat including a frustoconical face capable of sealing the output cavity against fluid flow into said exhaust vent when engaged with said poppet seat.

8. The valve of claim 7 wherein the pilot section and output section are contained in a single housing.

9. The vale of claim 7 in which the housing is formed of metal and the poppet is formed of plastic matrix.

10. In combination, a valve according to claim 7 and fluid impulse separation apparatus comprising an outer surface layer having a Young's modulus of at least 275,000 kPa and at least one inflatable tubular member positioned beneath the outer surface layer such that fluid impulse inflation of said tubular member causes reaction movement of said outer surface layer.

11. The valve of claim 5 further including a fluid actuator operably connected to said pilot section, the fluid actuator including a pilot piston reciprocally retained with a pilot cylinder and bearing on a pilot rod, the pilot piston moving a pilot rod which causes the ball to move from its load position to its dump position when fluid under pressure is introduced to pilot cylinder on the side of the pilot piston opposite that which bears on pilot rod.

12. The valve of claim 6 wherein the poppet and output cavity are of cylindrical shape and the poppet outside diameter is closely fitted to the inside diameter of the output cavity, one end of the output cavity containing said inlet port, the opposite end of said output cavity containing a circular poppet seat opening into said exhaust vent, the end of the poppet facing the poppet seat including a frustoconical face capable of sealing the output cavity against fluid flow when engaged with said poppet seat.

13. The valve of claim 12 in which the housing is formed of metal and the poppet is formed of plastic matrix.

14. In combination, the valve of claim 11 and a source of compressible fluid at a pressure substantially above atmospheric pressure.

15. The valve of claim 11, which when its inlet is connected to a source of a compressible fluid at a pressure elevated substantially above atmospheric pressure, has a dump cycle time of not more than 0.01 seconds.

16. The valve of claim 11 having an output section load position to dump position response time not exceeding 0.001 second.

17. The valve of claim 1 wherein the accumulation means is a chamber within the output housing.

18. The valve of claim 1 wherein the accumulation means is adjustable in volume.

19. The vale of claim 1 wherein the accumulation means is a chamber which surrounds the output housing.

20. The valve of claim 1 wherein the poppet

21. The valve of claim 1 wherein the pilot section, output section and accumulation means are contained in a single housing.

22. In combination, the valve of claim 1 and a source of compressible fluid at a pressure substantially above atmospheric pressure.

23. The valve of claim 1, which when its inlet is connected to a source of a compressible fluid at a pressure elevated substantially above atmospheric pressure, has a dump cycle time of not more than 0.01 seconds.

24. The valve of claim 1 having an output section load position into dump position response time not exceeding 0.001 second.

25. A method for providing a pulse of compressible fluid comprising:
providing a valve according to claim 1 with pilot section gate means in its load position; coupling the inlet of said valve to a source of compressible fluid at a pressure elevated substantially above atmospheric, said fluid coursing through said inlet conduit means, said intermediate conduit means, around said poppet, through said output conduit means, and into said accumulation means until the fluid pressure in said accumulation means is about equal to that at the inlet;
moving said pilot section gate means to its dump position, thereby initiating the following in rapid sequence: depletion of fluid pressure i the intermediate conduit means and that portion of the output cavity between said poppet and said inlet port through said exhaust conduit means, movement of the poppet toward said inlet port, thereby dumping in a single pulse fluid under pressure in the accumulation means through said output conduit means to said exhaust vent.

26. The method of claim 25 in which a pulse of compressible fluid is provided at the exhaust vent within 0.01 second after moving said pilot stage gate means to its dump position.

27. The method of claim 26 wherein fluid pressure in said accumulation means is restored to about equal to that at the inlet in about one second after returning said pilot section gate means to its load position.

28. The method of claim 25 wherein fluid pressure in said output conduit means and said accumulation means accelerates movement of said poppet from its load to its dump position.

29. The method of claim 25 wherein said poppet moves from its load to its dump position within 0.001 second.

30. In combination, a valve according to claim 1 and fluid impulse separation apparatus comprising an outer surface layer formed of a material having a Young's modulus of at least 40,000 kPa and at least one inflatable tubular member beneath the outer surface layer positioned such that fluid impulse inflation of said tubular member causes reaction movement of said outer surface layer.

31. A valve comprising pilot and output sections, the pilot section including a pilot housing containing a pilot cavity, inlet conduit means extending from the exterior of the pilot housing to the pilot cavity, intermediate exhaust conduit means extending from the pilot cavity to the exterior of the pilot housing, a pilot piston reciprocally mounted within the pilot cavity and operably connected to gate means configured for movement between a load position during which the output section is sealed off from fluid communication with said intermediate exhaust conduit means and an outlet associated with said output section and a dump position during which said output section is in fluid communication with said intermediate exhaust section is means nd said outlet, said pilot piston being configured to cause movement of said gate means from its load to its dump position upon introduction of fluid under pressure into said inlet conduit means;
the output section including an output housing containing an output cavity having an inlet orifice not in fluid communication with said inlet conduit means, an outlet and accumulation means, said outlet being sealed against fluid communication with said output cavity when said gate means is in load position and in fluid communication with said output cavity when said gate means is in dump position, and an output poppet reciprocally contained within said output cavity configured for movement from a load position during which fluid under pressure may enter the output cavity and force the poppet to seal off movement of fluid into the outlet while permitting flow of fluid into the accumulation means, and a dump position during which fluid under pressure may flow in a single pulse from said accumulation means to said outlet, said accumulation means opening to said output cavity proximate to said outlet.

32. The valve of claim 31 wherein the gate means includes an annular seat through which a portion of the pilot piston extends having an annular frustoconical face sealingly engaged with said annular seat when said Piston is in its load position.

33. The valve of claim 32 wherein the end face of the poppet facing the outlet includes a frustoconical face capable of sealing against fluid flow through said outlet when engaged with an outlet seat positioned at the end of the outlet cavity adjacent the outlet port.

34. The valve of claim 32 wherein the accumulation means is an annular chamber surrounding said output cavity.

35. The valve of claim 32 wherein the gate means is formed of two parts which are joined together after separate manufacture.

36. The valve of claim 35 wherein the gate means includes a piston end and a frustoconical face end which are joined by a rod having a diameter less than that of the piston end and the frustoconical face end.

37. The valve of claim 32 further including spring means which urges said frustoconical face of gate means into sealing engagement with said annular seat.

38. In combination
1) a master valve comprising pilot, intermediate and output sections, the pilot section including a pilot housing containing a pilot cavity, inlet conduit means extending from the exterior of the pilot housing to the pilot cavity, exhaust conduit means extending from the pilot cavity to the exterior of the pilot housing and intermediate conduit means extending from the pilot cavity to said intermediate section, gate means configured for movement from a load position during which the inlet conduit means is in fluid communication with said intermediate conduit means and a dump position during which the exhaust conduit means is in fluid communication with said intermediate conduit means while said inlet conduit means is disconnected from said intermediate conduit means;
the intermediate section including an intermediate housing containing an intermediate cavity having an inlet port in fluid communication with said intermediate conduit means, an exhaust vent, and an outlet portion fluid communication with output conduit means, the outlet port being proximate to the exhaust vent, and a poppet contained within said intermediate cavity configured for movement from a load position during which fluid under pressure may enter the intermediate cavity and force the poppet to seal off movement of fluid into the exhaust vent while permitting flow of fluid to the outlet port and a dump position during which fluid under pressure may flow from said output conduit means to said vent; the output section including an output housing containing an output cavity having an inlet orifice in fluid communication with said output conduit means, an outlet and accumulation means having an opening to said output cavity proximate to said outlet, and a piston contained within said output cavity configured for movement from a load position during which fluid under pressure may enter the output cavity through said inlet orifice and force the piston to seal off movement of fluid into the outlet while permitting flow of fluid into the accumulation means, and a dump position during which fluid under pressure may flow from said accumulation means to said outlet; and 2) at least one slave valve; comprising slave pilot and slave output sections, the slave pilot section including a slave pilot housing containing a slave pilot cavity, slave inlet conduit means extending from the exterior of the slave pilot housing to the slave pilot cavity, slave exhaust conduit means extending from the slave pilot cavity to the exterior of the slave pilot housing, and slave intermediate conduit means extending from the slave pilot cavity to said slave output section, slave gate means configured for movement from a load position during which the slave inlet conduit means is in fluid communication with said slave intermediate conduit means and a dump position during which the slave exhaust conduit means is in fluid communication with said slave intermediate conduit means while said slave inlet conduit means is disconnected from said slave intermediate conduit means; and the slave output section including a slave output housing containing a slave output cavity having a slave inlet port in fluid communication with said slave intermediate conduit means, a slave exhaust vent, and a slave outlet port in fluid communication with slave output conduit means and slave accumulation means, the slave outlet port in fluid slave exhaust vent, and a slave poppet contained within said slave output cavity configured for movement from a load position during which fluid under pressure may enter the slave output cavity and force the slave poppet to seal off movement of fluid into the slave exhaust vent while permitting flow of fluid to the slave outlet port and a dump position during which fluid under pressure may flow from said slave accumulation means through said slave output conduit means to said slave vent, further including a slave fluid actuator operably connected to the slave pilot section and configured to effect movement of said slave gate means from its load position to its dump position upon introduction of fluid under pressure into said slave fluid actuator; and 3) at least one fluid impulse separation apparatus comprising an outer surface layer formed of a material having a Young's modulus of at least 40,000 kPa and at least one inflatable tubular member beneath the outer surface layer positioned such that fluid impulse inflation of said tubular member causes reaction movement of said outer surface layer; wherein the exhaust vent of the pilot section or intermediate section of said master valve is in fluid communication with the inlet conduit means of the pilot section of said at least one slave valve and the outlet of said master valve is operably connected to an inflatable tubular member and the exhaust vent of said slave valve is operably connected to an inflatable tubular member.

39. The combination of claim 38 wherein the outlet of said master valve is operably connected to an inflatable tubular member and the exhaust vent of said slave valve is operably connected to the same inflatable tubular member distal from the connection of the inflatable tubular member with said master valve.

40. The combination of claim 38 including at least two slave valves, and associated conduit means configured to directly cause dumping of each of the slave valves into its respective inflatable tubular member upon dumping of the master valve.

41. The combination of claim 38 including a plurality of slave valves and fluid impulse separation apparatuses, the master valve, the slave valves and the separation apparatuses being joined by conduit means configured whereby dumping of the master valve initiates near simultaneous dumping of the slave valves each respectively into associated separation apparatuses.

42. The combination of claim 38, including a plurality of slave valves and fluid impulse separation apparatuses, the master valve, the slave valves and the separation apparatuses being joined by conduit means whereby dumping of the master valve initiates dumping of one of the slave valves into its associated separation apparatus and also sequentially initiates dumping of another of said slave valves into its associated separation apparatus.

43. In combination,
1) a master valve comprising pilot, intermediate and output sections,
the pilot section including a pilot housing containing a pilot cavity, inlet conduit means extending from the exterior of the pilot housing to the pilot cavity, exhaust conduit means extending from the pilot cavity to the exterior of the pilot housing, and intermediate conduit means extending from the pilot cavity to said intermediate section, gate means configured for movement from a load position during which the inlet conduit means is in fluid communication with said intermediate conduit means and a dump position during which the exhaust conduit means is in fluid communication with said intermediate conduit means while said inlet conduit means is disconnected from said intermediate conduit means;

the intermediate section including an intermediate housing containing an intermediate cavity having an inlet port in fluid communication with said intermediate conduit means, an exhaust vent, and an outlet port in fluid communication with output conduit means the outlet port being proximate to the exhaust vent, and a poppet contained within said intermediate cavity configured for movement from a load position during which fluid under pressure may enter the intermediate cavity and force the poppet to seal off movement of fluid into the exhaust vent while permitting flow of fluid to the outlet port and a dump position during which fluid under pressure may flow from said output conduit means to said vent;

the output section including an output housing containing an output cavity having an inlet orifice in fluid communication with said output conduit means, an outlet and accumulation means having an opening to said output cavity proximate to said outlet, and a piston contained within said output cavity configured for movement from a load position during which fluid under pressure may enter the output cavity through said inlet orifice and force the piston to seal off movement of fluid into the outlet while permitting flow of fluid into the accumulation means, and a dump position during which fluid under pressure may flow from said accumulation means to said outlet; and 2) at least one slave valve;

comprising slave pilot and slave output sections, the slave pilot section including a slave pilot housing containing a slave pilot cavity, slave inlet conduit means extending from the exterior of the slave pilot housing to the slave pilot cavity, slave intermediate exhaust conduit means extending from the slave pilot cavity to the exterior of the slave pilot housing a slave pilot piston reciprocably mounted within the slave pilot cavity and operably connected to slave gate means configured for movement between a load position during which the slave output section is sealed off from fluid communication with said slave intermediate exhaust conduit means and a slave outlet associated with said slave output section and a dump position during which said slave output section is in fluid communication with said slave intermediate exhaust conduit means and said slave outlet, said slave pilot piston being configured to cause movement of said slave gate means from its load to its dump position upon introduction of fluid under pressure into said slave inlet conduit means;

the slave output section including a slave output housing containing a slave output cavity having a slave inlet orifice not in fluid communication with said slave inlet conduit means a slave outlet and slave accumulation means, said slave outlet being sealed against fluid communication with said slave output cavity when said slave gate means is in load position and in fluid communication with said slave output cavity when said slave gate means is in dump position, and a slave output poppet reciprocably contained within said slave output cavity configured for movement from a load position during which fluid under pressure may enter the slave output cavity and force the slave poppet to seal off movement of fluid into the slave outlet while permitting flow of fluid into the slave accumulation means, and a dump position during which fluid under pressure may flow in a single pulse from said slave accumulation means to said slave outlet, said slave accumulation means opening to said slave output cavity proximate to said slave outlet; and 3) at least one fluid impulse separation apparatus comprising an outer surface layer formed of a material having a Young's modulus of at least 40,000 kPa and at least one inflatable tubular member beneath the outer surface layer positioned such that fluid impulse inflation of any said tubular member causes reaction movement of said outer surface layer; wherein the exhaust of one of the pilot section of the master valve or the intermediate section of the master valve is joined by conduit means to the inlet conduit means of the slave pilot section of said at least one slave valve and the outlet of said master valve is joined by conduit means to said at least one inflatable tubular member and the slave outlet of said at least one slave valve is joined to said at least one inflatable tubular member.

44. The combination of claim 43 including a plurality of slave valves and fluid impulse inflatable tubular members, the master valve, the slave valves and the fluid impulse inflatable tubular members being joined by conduit means whereby dumping of the master valve results in dumping of all slave valves each into the respective inflatable tubular member to which it is connected, said dumping occurring in the order in which the slave valves are operably connected.

45. In combination, a master valve comprising pilot and output sections, the pilot section including a pilot housing containing a pilot cavity, inlet conduit means extending from the exterior of the pilot housing to the pilot cavity, exhaust conduit means extending from the pilot cavity to the exterior of the pilot housing, and intermediate conduit means extending from the pilot cavity to said output section, gate means configured for movement from a load position during which the inlet conduit means is in fluid communication through said pilot cavity and said exhaust conduit means is sealed off from fluid communication with said intermediate conduit means by said gate means, with said intermediate conduit means and a dump position during which the exhaust conduit means is in fluid communication with said intermediate conduit means while said inlet conduit means is disconnected from said intermediate conduit means; and the output section including an output housing containing an output cavity having an inlet port in fluid communication with said intermediate conduit means, an exhaust vent, and an outlet port in fluid communication with output conduit means and accumulation means, the outlet port being proximate to the exhaust vent, and a poppet contained within said output cavity configured for movement from a load position during which fluid under pressure may enter the output cavity and force the poppet to seal off movement of fluid into the exhaust vent while permitting flow of fluid to the outlet port and a dump position during which fluid under pressure may flow from said accumulation means through said output conduit means to said vent;

a slave valve comprising slave pilot and slave output sections, the slave pilot section including a slave pilot housing containing a slave pilot cavity, slave inlet conduit means extending from the exterior of the slave pilot housing to the slave pilot cavity, slave exhaust conduit means extending from pilot cavity to the exterior of the slave pilot and slave intermediate conduit means extending from the slave pilot cavity to said slave output section, slave gate means configured for movement from a load position during which the slave inlet conduit means is in fluid communication with said slave intermediate conduit means and a dump position during which the slave exhaust conduit means is in fluid communication with said slave intermediate conduit means while said slave inlet conduit means is disconnected from said slave intermediate conduit means;

the slave output section including a slave output housing containing a slave output cavity having a slave inlet port in fluid communication with said slave intermediate conduit means, a slave exhaust vent, and a slave outlet port in fluid communication with slave output conduit means and slave accumulation means, the slave outlet port being proximate to the slave exhaust vent, and a slave poppet contained with said slave output cavity configured for movement from a load position during which fluid under pressure may enter the slave output cavity and force the slave poppet to seal off movement of fluid into the slave exhaust vent while permitting flow of fluid to the slave outlet port and a dump position during which fluid under pressure may flow from said slave accumulation means through said slave output conduit means to said slave vent, further including a slave fluid actuator operably connected to the slave pilot section and configured to effect movement of said slave gate means from its load position to its dump position upon introduction of fluid under pressure into said slave fluid actuator;

and fluid impulse separation apparatus comprising an outer surface layer formed of a material having a Young's modulus of at least 40,000 kPa and at least two inflatable tubular members beneath the outer surface layer positioned such that fluid impulse inflation of said tubular members cause reaction movement of said outer surface layer, said master valve and said slave valve and said at least two inflatable tubular members being operably connected such that dumping of said master valve causes one of said at least two inflatable members to inflate and initiates dumping of said slave valve which causes another of said at least two inflatable members to inflate.

46. In combination, a master valve comprising master pilot and master output sections, the master pilot section including a master pilot housing containing a master pilot cavity, master inlet conduit means extending from the exterior of the master pilot housing to the master pilot cavity, master exhaust conduit means extending from the master pilot cavity to the exterior of the master pilot housing, and master intermediate conduit means extending from the master pilot cavity to said master output section, master gate means configured for movement from a load position during which the master inlet conduit means is in fluid communication with said master intermediate conduit means and a dump position during which the master exhaust conduit means is in fluid communication with said master intermediate conduit means while said master inlet conduit means is disconnected from said master intermediate conduit means, and a solenoid operably connected to the master pilot section for movement of said master gate means between its load and dump positions;

the master output section including a master output housing containing a master output cavity having a master inlet port in fluid communication with said master intermediate conduit means, a master exhaust vent, and a master outlet port in fluid communication with master output conduit means and master accumulation means, the master outlet port being proximate to the master exhaust vent, and a master poppet contained with said master output cavity configured for movement from a load position during which fluid under pressure may enter the master output cavity and force the master poppet to seal off movement of fluid into the master exhaust vent while permitting flow of fluid to the master outlet port and a dump position during which fluid under pressure may flow from said master accumulation means through said master output conduit means to said master vent;

at least one slave valve comprising slave pilot and slave output sections, the slave pilot section including a slave pilot housing containing a slave pilot cavity, slave inlet conduit means extending from the exterior of the slave pilot housing to the slave pilot cavity, slave exhaust conduit means extending from the slave pilot cavity to the exterior of the slave pilot housing, and slave intermediate conduit means extending from the slave pilot cavity to said slave pilot output section, slave gate means configured for movement from a load position during which the slave inlet conduit means is in fluid communication with said slave intermediate conduit means and a dump position during which the slave exhaust conduit means is in fluid communication with said slave intermediate conduit means while said slave inlet conduit means is disconnected from said slave intermediate conduit means; and the slave output section including a slave output housing containing a slave output cavity having a slave inlet port in fluid communication with said slave intermediate conduit means, a slave exhaust vent, and a slave outlet port in fluid communication with slave output conduit means and slave accumulation means, the slave outlet port being proximate to the slave exhaust vent, and a slave poppet contained with said slave output cavity configured for movement from a load position during which fluid under pressure may enter the slave output cavity and force the slave poppet to seal off movement of fluid into the slave exhaust vent while permitting flow of fluid to the slave outlet port and a dump position during which fluid under pressure may flow from said slave accumulation means through said slave output conduit means to said slave vent, wherein said slave inlet conduit means, said slave exhaust conduit means and said slave intermediate conduit means are each operably connected to said slave pilot cavity, said slave pilot cavity containing said slave gate means comprising a ball moveable from a load position during which the ball permits movement of fluid from said slave inlet conduit means into said slave intermediate conduit means and a dump position during which the ball prevents movement of fluid from said slave inlet conduit means into said slave intermediate conduit means while permitting movement of fluid from said slave intermediate conduit means to said slave exhaust conduit means, said slave valve further including a slave fluid actuator operably connected to said slave pilot section, said slave fluid actuator including a slave pilot piston reciprocally retained within a slave pilot cylinder and bearing on a slave pilot rod, the slave pilot piston moving a slave pilot rod which causes the slave ball to move from its load position to its dump position when fluid under pressure is introduced to the slave pilot cylinder on the side of the slave pilot piston opposite to that which bears on the slave pilot rod;

and fluid impulse separation apparatus comprising an outer surface layer formed of a material having a Young's modulus of at least 40,000 kPa and at least two inflatable tubular members beneath the outer surface layer positioned such that fluid impulse inflation of said tubular members causes reaction movement of said outer surface layer, said master valve and said slave valve and said at least two inflatable tubular members being operably connected such that dumping of said master valve causes one of said at least two inflatable members to inflate and initiates dumping of said slave valve which causes another of said at least two inflatable members to inflate.

47. The combination of claim 46, further including at least one additional valve comprising additional pilot and additional output sections, the additional pilot section including an additional pilot housing containing an additional pilot cavity, additional inlet conduit means extending from the exterior of the additional pilot housing to the additional pilot cavity, additional intermediate exhaust conduit means extending from the additional pilot cavity to the exterior of the additional pilot housing, an additional pilot piston reciprocably mounted within the additional pilot cavity and operably connected to additional gate means configured for movement between a load position during which the additional output section is sealed off from fluid communication with said additional intermediate exhaust conduit means and an additional outlet associated with said additional output section and a dump position during which said additional output section is in fluid communication with said additional intermediate exhaust conduit means and said additional outlet, said additional pilot piston being configured to cause movement of said additional gate means from its load to its dump position upon introduction of fluid under pressure into said additional inlet conduit means;

the additional output section including an additional output housing containing an additional output cavity having an additional inlet orifice not in fluid communication with said additional inlet conduit means, an additional outlet and additional accumulation means, said additional outlet being sealed against fluid communication with said additional output cavity when said additional gate means is in load position and in fluid communication with said additional output cavity when said additional gate means is in dump position, and an additional output poppet reciprocably contained within said additional output cavity configured for movement from a load position during which fluid under pressure may enter the additional output cavity and force the additional poppet to seal off movement of fluid into the additional outlet while permitting flow of fluid into the additional accumulation means, and a dump position during which fluid under pressure may flow in a single pulse from said additional accumulation means to said additional output cavity proximate to said additional outlet, said at least one additional valve operably connected to one of said master valve and said slave valve such that dumping of said master valve initiates dumping of all other valves in the order in which they are operably connected.

48. In combination, a master valve comprising master pilot and master output sections, the master pilot section including a master pilot housing containing a master pilot cavity, master inlet conduit means extending from the exterior of the master pilot housing to the master pilot cavity, master exhaust conduit means extending from the master pilot cavity to the exterior of the master pilot housing, and master intermediate conduit means extending from the master pilot cavity to said master output section, master gate means configured for movement from a load position during which the master inlet conduit means and a dump position during which the master exhaust conduit means is in fluid communication with said master intermediate conduit means, and a solenoid operably connected to the master pilot section for movement of said master ate means between its load and dump positions;

the master output section including a master output housing containing a master output cavity having a master inlet port in fluid communication with said master intermediate conduit means, a master exhaust vent, and a master outlet port in fluid communication with master output conduit means and master accumulation means, the master outlet port being proximate to the master exhaust vent, and a master poppet contained within said master output cavity configured for movement from a load position during which fluid under pressure may enter the master output cavity and force the master poppet to seal off movement of fluid into the master exhaust vent while permitting flow of fluid to the master outlet port and a dump position during which fluid under pressure may flow from said master accumulation means through said master output conduit means to said master vent;

at least a first slave valve comprising first slave pilot and first slave output sections, the first slave pilot section including a first slave pilot housing containing a first slave pilot cavity, first slave inlet conduit means extending from the exterior of the first slave pilot housing to the first slave pilot cavity, first slave intermediate exhaust conduit means extending form the first slave pilot cavity to the exterior of the first slave pilot housing, a first slave pilot piston reciprocably mounted within the first slave pilot cavity and operably connected to first slave gate means configured for movement between a load position during which the first slave output section is sealed off from fluid communication with said first slave intermediate exhaust conduit means and a first slave outlet associated with said first slave output section and a dump position during which said first slave output section is in fluid communication with said first slave intermediate exhaust conduit means and said first slave outlet, said first slave pilot piston being configured to cause movement of said first slave gate means from its load to its dump position upon introduction of fluid under pressure into said first slave inlet conduit means;

said first slave output section including a first slave output housing containing a first slave output cavity having a first slave inlet orifice not in fluid communication with said first slave inlet conduit means, a first slave outlet and first slave accumulation means, said first slave outlet being sealed against fluid communication with said first slave output cavity when said first slave gate means is in load position and in fluid communication with said first slave output cavity when said first slave gate means is in dump position, and a first slave output poppet reciprocably contained within said first slave output cavity configured for movement from a load position during which fluid under pressure may enter said first slave output cavity and force the first slave poppet to seal off movement of fluid into the first slave outlet while permitting flow of fluid into the first slave accumulation means, and a dump position during which fluid under pressure may flow in a single pulse from said first slave accumulation means to said first slave outlet, said first slave accumulation means opening to said first slave output cavity proximate to said first slave outlet;

said fluid impulse separation apparatus comprising an outer surface layer formed of a material having a Young's modulus of at least 40,000 kPa and at least two inflatable tubular members beneath the outer surface layer positioned such that fluid impulse inflation of said tubular members causes reaction movement of said outer surface layer, said master valve and said first slave valve and said at least two inflatable tubular members being operably connected such that dumping of said master valve causes one of said at least two inflatable members to inflate and initiates dumping of said first slave valve which causes another of said at least two inflatable members to inflate.

49. The combination of claim 48 further including at least one valve hereinafter referred to as a second slave valve, said second slave valve comprising second slave pilot and second slave output sections, the second slave pilot section including a second slave pilot housing containing a second slave pilot cavity, second slave inlet conduit means extending from the exterior of the second slave pilot housing to the second slave pilot cavity, second slave exhaust conduit means extending from the second slave pilot cavity to the exterior of the second slave pilot housing, and second slave intermediate conduit means extending from the second slave pilot cavity to said second slave output section, second slave gate means configured for movement from a load position during which the second slave inlet conduit means is in fluid communication with said second slave intermediate conduit means and a dump position during which the second slave exhaust conduit means is in fluid communication with said second slave intermediate conduit means while said second slave inlet conduit means is disconnected from said second slave intermediate conduit means;

the second slave output section including a second slave output housing containing a second slave output cavity having a second slave inlet port in fluid communication with said second slave intermediate conduit means, a second slave exhaust vent, and a second slave outlet port in fluid communication with second slave output conduit means and second slave accumulation means, the second slave outlet port being proximate to the second slave exhaust vent, and a second slave poppet contained within said second slave output cavity configured for movement from a load position during which fluid under pressure may enter the second slave output cavity and force the second slave poppet to seal off movement of fluid into the second slave exhaust vent while permitting flow of fluid to the second slave outlet port and a dump position during which fluid under pressure may flow from said second slave accumulation means through said second slave output conduit means to said second slave vent, further including a second slave fluid actuator operably connected to the second slave pilot section and configured to effect movement of said second slave gate means from its load position to its dump position upon introduction of fluid under pressure into said second slave fluid actuator, wherein said second slave inlet conduit means, said second slave exhaust conduit means and said second slave intermediate conduit means are each operably connected to said second slave pilot cavity, said second slave pilot cavity containing said second slave gate means comprising a ball movable from a load position during which the ball permits movement of fluid from said second slave inlet conduit means into said second slave intermediate conduit means and a dump position during which the ball prevents movement of fluid from said second slave inlet conduit means into said second slave intermediate conduit means while permitting movement of fluid from said second slave intermediate conduit means to said second slave exhaust conduit means, said second slave valve further including a second slave fluid actuator operably connected to said second slave pilot section, the second slave fluid actuator including a second slave pilot piston reciprocally retained within a second slave pilot cylinder and bearing on a second slave pilot rod, the second slave pilot piston moving a second slave pilot rod which causes the second slave ball to move from its load position to its dump position when fluid under pressure is introduced to second slave pilot cylinder on the side of the second slave pilot piston opposite that which bears on second slave pilot rod, said second slave valve operably connected to one of said master valve and said first slave valve such that dumping of said master valve initiates dumping of all slave valves in the order in which they are operably connected.

50. A fluid impulse separation system comprising at least one master valve, at least a first slav valve, having a fluid-operated actuator and at least one fluid impulse separation apparatus operably connected by associated conduit means;

said master valve having a first fluid output port and a second fluid output port, said first output port being operably connected to the fluid-operated actuator of said first slave valve and a second outlet port operably connected to one of a fluid impulse separation apparatus and a second slave valve;

each of said first and second slave valves having a fluid output port operably connected to at least one of a fluid impulse separation apparatus and a third slave valve;

each said fluid impulse separation apparatus comprising an outer surface layer and an inflatable member positioned beneath the outer surface layer such that fluid impulse inflation of said inflatable member causes reaction movement of said outer surface layer;

said master valve and said first, second and third slave valves and each fluid impulse separation apparatus being operably connected, said master valve including means for initiating dumping, such that dumping of said master valve causes inflation of any inflatable member to which an output port of said master valve is operably connected and actuates any slave valve to which an output port of said master valve is operably connected, respectively.

51. The separation system of claim 50 wherein each of said master slave valves is connected to a source of high pressure gas.

52. The system of claim 50 including a plurality of slave valves operably connected such that dumping of the master valve initiates sequential dumping of all slave valves in the order in which they are connected.

53. The system of claim 52 including at least a pair of slav valves connected in parallel such that dumping of the master valve initiates nearly simultaneous dumping of such parallel connected slave valves.

* * * * *